US011416629B2

(12) United States Patent
Fair et al.

(10) Patent No.: US 11,416,629 B2
(45) Date of Patent: Aug. 16, 2022

(54) METHOD FOR DYNAMIC PSEUDOFS CREATION AND MANAGEMENT IN A NETWORK FILESYSTEM

(71) Applicant: EMC IP Holding Company LLC, Hopkinton, MA (US)

(72) Inventors: Robert L. Fair, Cary, NC (US); Thomas R. Vanderputten, Chapel Hill, NC (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 467 days.

(21) Appl. No.: 15/883,869

(22) Filed: Jan. 30, 2018

(65) Prior Publication Data

US 2019/0236295 A1 Aug. 1, 2019

(51) Int. Cl.

*G06F 21/62* (2013.01)
*H04L 9/40* (2022.01)
*G06F 16/11* (2019.01)

(52) U.S. Cl.

CPC .......... *G06F 21/6218* (2013.01); *G06F 16/11* (2019.01); *H04L 63/101* (2013.01)

(58) Field of Classification Search

CPC .. G06F 2221/2141; G06F 21/53; G06F 21/52; G06F 21/54; G06F 21/566; G06F 2221/2113; G06F 2221/2149; G06F 3/04815; G06F 16/1844; G06F 16/188; G06F 16/93; G06F 21/6218

USPC ........... 707/600–831, 899, 999.001–999.206

See application file for complete search history.

(56) References Cited

U.S. PATENT DOCUMENTS 7,289,964 B1 * 10/2007 Bowman-Amuah ........................ G06F 9/5038 705/1.1
8,041,761 B1 * 10/2011 Banga ..................... H04L 63/20 709/201
2002/0095454 A1 * 7/2002 Reed ....................... H04L 67/28 709/201
2003/0009449 A1 1/2003 Grubbs et al.
2003/0105811 A1 * 6/2003 Laborde ................ G06F 16/256 709/203
2004/0098415 A1 * 5/2004 Bone ....................... G06F 16/10
2004/0250113 A1 * 12/2004 Beck .................. G06F 11/0745 726/27
2006/0010150 A1 1/2006 Shaath et al.
2006/0129558 A1 * 6/2006 Brown .................... G06F 16/10
2006/0288034 A1 12/2006 Do et al.
2007/0288247 A1 * 12/2007 Mackay ................ G06F 16/113 705/1.1
2013/0339406 A1 * 12/2013 Kanfi ................... G06F 16/289 707/825

(Continued)

OTHER PUBLICATIONS

U.S. Appl. No. 15/883,960, filed Apr. 15, 2020, Office Action.
U.S. Appl. No. 15/883,960, filed Jan. 30, 2018, by Fair et al.

*Primary Examiner* — Angelica Ruiz
(74) *Attorney, Agent, or Firm* — Workman Nydegger

(57) ABSTRACT

One example method includes connecting to a fileserver of a data protection system, initiating, at a client, an operation that is associated with a master pseudofs of the fileserver, creating, at the client, a client-specific pseudofs based upon the master pseudofs, and the client-specific pseudofs includes only those nodes of the master pseudofs that the client is authorized to access, and performing the operation using the client-specific pseudofs.

19 Claims, 4 Drawing Sheets

(56) References Cited

U.S. PATENT DOCUMENTS

| | | | | |
|---|---|---|---|---|
| 2014/0075004 | A1* | 3/2014 | Van Dusen | H04L 41/04 709/223 |
| 2014/0310473 | A1* | 10/2014 | Bilas | G06F 11/00 711/129 |
| 2015/0242273 | A1* | 8/2015 | Resch | G06F 21/62 714/763 |
| 2016/0004693 | A1* | 1/2016 | Chen | G06F 3/0605 707/825 |
| 2016/0231952 | A1* | 8/2016 | Broido | G06F 16/13 |
| 2016/0371297 | A1 | 12/2016 | Okun | |
| 2017/0019457 | A1 | 1/2017 | Latha et al. | |
| 2017/0235647 | A1* | 8/2017 | Kilaru | G06F 11/1464 707/652 |
| 2019/0005154 | A1 | 1/2019 | Tripathi et al. | |
| 2019/0129893 | A1* | 5/2019 | Baird, III | H04L 9/30 |

* cited by examiner

METHOD FOR DYNAMIC PSEUDOFS CREATION AND MANAGEMENT IN A NETWORK FILESYSTEM

RELATED APPLICATIONS

This application is related to U.S. patent application Ser. No. 15/883,960, entitled SPARSE CREATION OF PER-CLIENT PSEUDOFS IN NETWORK FILESYSTEM WITH LOOKUP HINTING, filed the same day herewith, and incorporated herein in its entirety by this reference.

FIELD OF THE INVENTION

Embodiments of the present invention generally relate to the creation, management, and use, of pseudo filesystems. More particularly, at least some embodiments of the invention relate to systems, hardware, software, computer-readable media, and methods directed to the creation and use of a master pseudo filesystem that is used as a basis for dynamic generation of one or more client-specific pseudo filesystems. At least some embodiments may be employed in connection with a network filesystem.

BACKGROUND

Network filesystems may use a single namespace root such as '/' for browsing by one or more clients. In typical systems and configurations, all of the resources, sometimes referred to as exports, that are potentially available to system clients, are placed in a virtual filesystem under the root. This virtual filesystem is sometimes referred to as a pseudo filesystem, or 'pseudofs.'

In some typical systems and configurations, the pseudofs is constructed as a fixed tree which provides visibility of system resources to clients. The use of the fixed tree approach has proven problematic in some regards however. For example, in the event that a change is required to be implemented to the fixed tree, a system restart/reset is typically required in order to make the change stick.

In another typical approach, a generic pseudofs is employed. However, because the needs of each client often differ, use of the generic pseudofs requires the implementation of client-based access control. This approach is problematic at least because access control for the various clients has to be defined and implemented with respect to each node of the pseudofs. Implementation of this type of access control in a large pseudofs that is potentially accessible by many clients may take a significant amount of time and resources, and as such is prone to errors and other problems.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
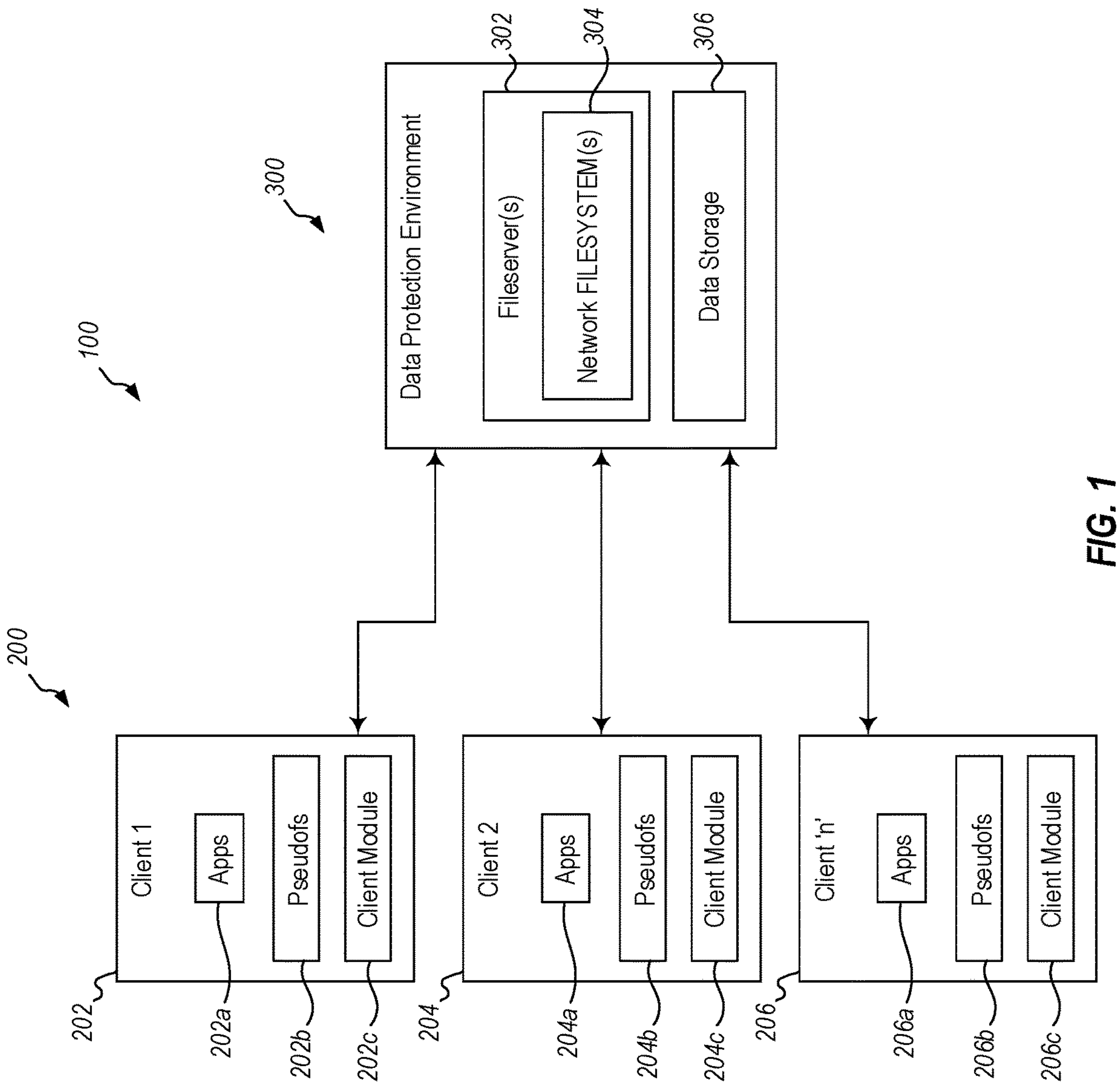
FIG. 1 discloses aspects of an example operating environment for at least some embodiments.

Embodiments of the present invention generally relate to the creation, management, and use, of pseudo filesystems. More particularly, at least some embodiments of the invention relate to systems, hardware, software, computer-readable media, and methods directed to the creation and use of a master pseudo filesystem that is used as a basis for dynamic generation of one or more client-specific pseudo filesystems. At least some embodiments may be employed in connection with a network filesystem.

In light of the technological problems noted herein, and others, what is needed are ways to improve client access to filesystem resources, while maintaining conformance with security requirements, and reducing filesystem processing overhead. Thus, at least some embodiments of the invention may fully or partially resolve one or more of the technological problems noted herein, and/or other technological problems, by providing processes for creating and managing client-specific pseudofs. In more detail, example embodiments improve, for example, the operation of computing systems, methods, and devices, by providing more efficient use of filesystem resources, enabling creation of client-specific pseudofs only when needed, and improving the speed with which a client can identify and access only visible resources. As well, since embodiments of the invention create/update a client-specific pseudofs on an as-needed basis, such embodiments may eliminate the need to create a client-specific pseudofs ahead of time, before it is actually needed, and may accordingly also eliminate the possibility that a client-specific pseudofs is incorrectly configured. Further, embodiments of the invention can eliminate the use of stale filehandles that require a filesystem unmount/mount process, by automatically updating a client-specific pseudofs. The foregoing are provided only by way of example, and various other improvements to the operation of computing systems, methods, and devices will be apparent from this disclosure.

More particularly, it would be useful to create the client-specific pseudofs on-the-fly so that a pseudofs is only created when needed, and so that the client-specific pseudofs provides visibility, to the client, of only those network resources that the client is authorized to access. Correspondingly, it would likewise be useful to be able to expire the client-specific pseudofs when it is no longer needed, so as to free system resources such as memory and/or storage.

As well, it would further be useful to create each of the client-specific pseudofs based on a master pseudofs that describes the entire filesystem. In addition to providing a common basis for creation of one or more client-specific pseudofs, the master pseudofs may be integrated with resource management in the filesystem to allow both the master pseudofs and the client-specific pseudofs to be dynamically, and automatically, updated to add or remove resources to/from the client-specific pseudofs and/or master pseudofs, as applicable, to reflect changes made with respect to one or more filesystem resources.

It would also be useful to provide a system for defining, managing, and using client-specific pseudofs that is readily scalable. Scalability is particularly advantageous where, by way of illustration, a single namespace may include 1000+ filesystem resources, or nfs exports, each of which may be accessible by 1000+ unique clients.

Further, because security constraints for each client, such as which portions of the master pseudofs the client is authorized to access, may be defined in advance, such as by the filesystem server, security can be implemented on a client-specific basis. Thus, there is no need to define security at each node of the master pseudofs.

It is noted here that this disclosure embraces any class of network protocols/software that present a filesystem abstraction over a network. As such, these classes of network protocols/software may be referred to broadly herein as network filesystems ('nfs'). Consistently, associated pseudo filesystems, such as the aforementioned filesystem abstraction, may be referred to broadly herein as a 'pseudofs.' In general, embodiments of the invention can be employed in connection with, among other things, any nfs that uses a pseudofs and a single root.

Where the terms 'NFS,' 'FS,' or 'pseudoFS' are employed herein, those terms refer to specific respective implementations of an nfs or pseudofs such as, for example, the Network Filesystem version 4 (NFSv4) pseudo Filesystem (pseudoFS) that is the Internet Engineering Task Force (IETF) standard for filesharing defined by the NFSv4 RFCs (such as Request for Comment (RFC) memorandum 7530). However, the scope of the invention is not limited to those specific implementations, nor to any other specific implementations. Rather, the NFS and pseudoFS disclosed herein are presented solely as illustrative examples of an nfs and pseudofs and, as such, are not limiting of the scope of the disclosure or claims in any way. Another example of an nfs is a filesystem that conforms with the Microsoft common internet file system (CIFS)/Server Message Block (SMB) Protocol.

With reference now to one particular example embodiment, a group of nfs exports is created, such as by an administrator for example, and then decomposed by a pseudofs master module into an overlaid tree of elements that collectively define the master pseudofs. Examples of nfs exports include, but are not limited to, directories, subdirectories, and files or any other type of data object. The decomposition process may be performed by, or at the direction of, a filesystem server that includes the pseudofs master module and communicates with one or more clients, each of which is associated with a respective client-specific pseudofs created based on the master pseudofs.

The client-specific pseudofs may be created dynamically, such as when the client boots and mounts the filesystem at the client. The client can then traverse the master pseudofs beginning at the root, and only those portions of the master pseudofs that the client is authorized to access will be visible to the client. Even if the client asks to see an unauthorized export, the fileserver will prevent visibility of that export to the client. By traversing the master pseudofs, the client-specific pseudofs is automatically defined. The access rights of a particular client can be defined by/at the filesystem server, such as by an administrator, or elsewhere. Where multiple clients in a computing environment require the same access, access rights for that group of clients can be defined and implemented using a batch process.

As filesystem changes occur, those changes are used by the filesystem server to automatically update the master pseudofs, and the changes are then communicated automatically to the clients. Then, the clients may automatically traverse the updated master pseudofs in order to update the client-specific pseudofs.

When a client-specific pseudofs has not been accessed by the client for a defined period of time, the client-specific pseudofs, which may reside in storage or memory, is automatically aged out or expired after expiration of that time period. In this way, filesystem resources such as memory or storage are used only so long as needed, thus contributing to more efficient use of those filesystem resources.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in a data protection environment such as a cloud services environment that may be, or include, a data protection system operating environment that includes one or more storage systems or storage environments including primary storage and data protection storage. In some specific example embodiments of the invention, at least some functionality may be provided by, or implemented in connection with, a platform such as the Dell-EMC DataDomain data protection platform, and associated systems, methods, and components, although use of this particular platform is provided only by way of illustration and is not required.

The storage environment may take the form of a cloud storage environment, an on-premises storage environment, and hybrid storage environments that include public and private elements, although the scope of the invention extends to any other type of storage environment as well. More generally, embodiments of the invention can be implemented in any suitable environment, including a cloud services environment, and the scope of the invention is not limited to the example environments disclosed herein. Any of these cloud environments, or other operating environments, can take the form of an operating environment that is partly, or completely, virtualized.

The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications and data include email applications such as MS Exchange, database applications such as SQL Server, filesystems, as well as datastores such as Oracle databases for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular reference now to FIG. 1, an example operating environment 100 may include a plurality of clients 200, such as clients 202, 204 and 206. Each of the clients 200 may host one or more applications 202*a*, 204*a* and 206*a*, respectively, that create new and/or modified data that is desired to be protected. As such, the clients 200 are examples of host devices. One, some, or all, of the clients 200 may take the form of a VM, although that is not required. In general, the VM is a virtualization of underlying hardware and/or software and, as such, one or more of the clients 200 may include or otherwise be associated with various underlying components.

As well, each of the clients 200 may include a respective client-specific pseudoFS 202*b*, 204*b* and 206*b*, which may be generated, respectively, by pseudoFS client modules 202*c*, 204*c* and 206*c*. In general, and as disclosed in more detail elsewhere herein, the client-specific pseudoFS 202*b*, 204*b* and 206*b* enable the associated respective client to view and access one or more select portions of a master pseudoFS. Examples of some operations that may be performed in whole or in part using the client-specific pseudoFS 202*b*, 204*b* and 206*b* include read operations, write operations, backup operations, and restore operations.

With continued reference to FIG. 1, the example operating environment may further include a data protection environment 300, one example of which is the Dell-EMC DataDomain data protection environment. The data protection environment 300, which may comprise or consist of a cloud storage datacenter, includes one or more network fileservers (NFS) 302 that are accessible, either directly or indirectly, by the clients 200. Further details concerning example implementations of a fileserver are provided in connection with the discussion of FIG. 3. Each of the NFS(s) 302 can include one or more corresponding network filesystems 304, and/or portions thereof.

Finally, the data protection environment 300 may include and/or have access to data storage 306, such as a data storage array for example, that communicates with, or comprises an element of, the NFS(s) 302. In general, the data storage 306 is configured to store client 200 data backups that can be restored to the clients 200 in the event that a loss of data or other problem occurs with respect to the clients 200. The term data backups is intended to be construed broadly and includes, but is not limited to, partial backups, incremental backups, full backups, clones, snapshots, any other type of copies of data, and any combination of the foregoing. Any of the foregoing may, or may not, be deduplicated.

The data storage 306 can employ, or be backed by, a mix of storage types, such as Solid State Drive (SSD) storage for transactional type workloads such as databases and boot volumes whose performance is typically considered in terms of the number of input/output operations (IOPS) performed. Additionally, or alternatively, the data storage 306 can use Hard Disk Drive (HDD) storage for throughput intensive workloads that are typically measured in terms of data transfer rates such as MB/s.

B. Aspects of Example PseudoFS Architecture

Figure 2:
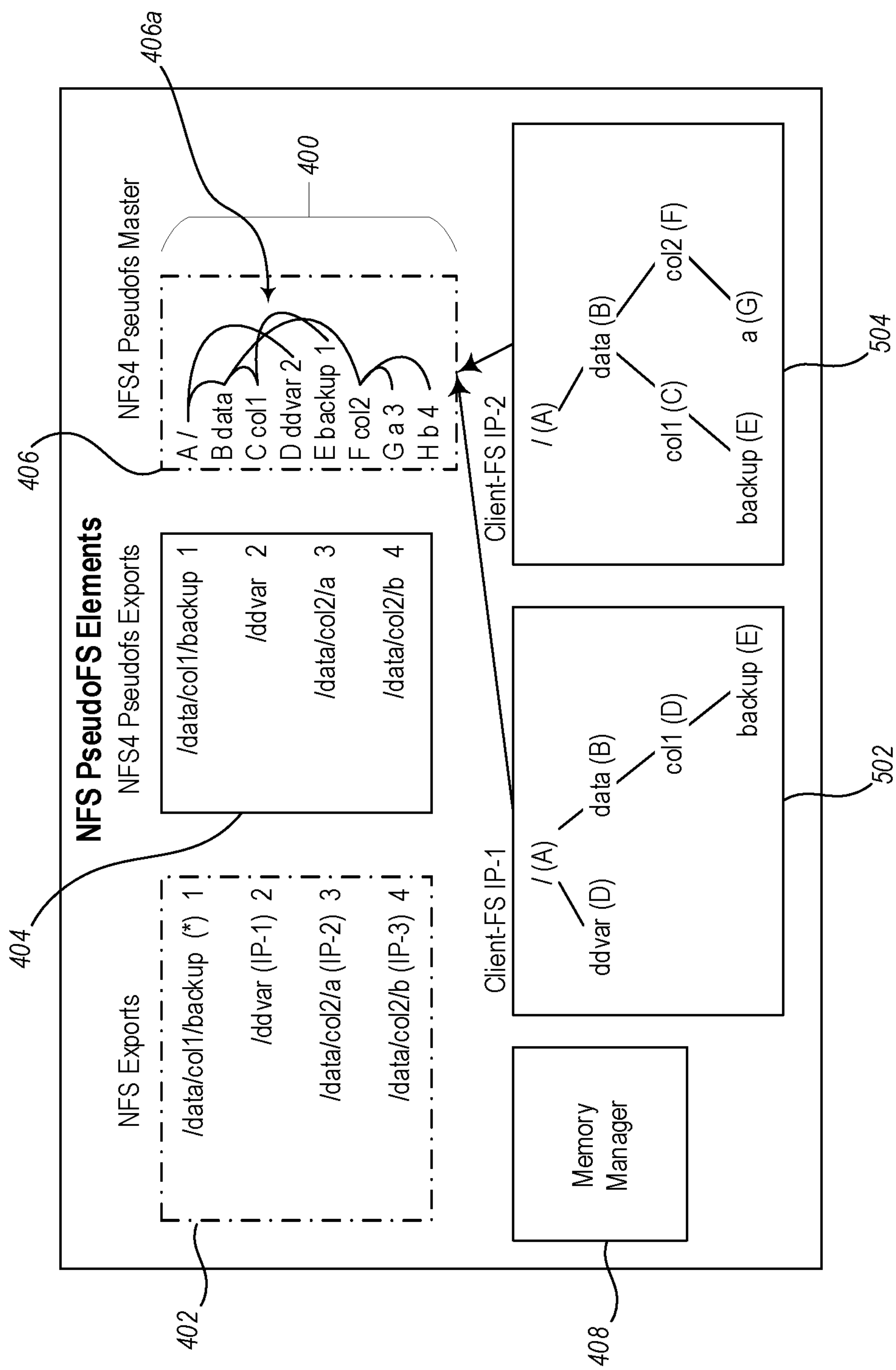
FIG. 2 discloses aspects of an example fileserver and associated clients.

Directing attention now to FIG. 2, details are provided concerning a fileserver, one example of which is denoted generally at 400. In the disclosed example, the NFS 400 includes an Network Filesystem (NFS) Exports module 402, an NFS PseudoFS Exports Module 404, and a NFS4 PseudoFS Master subsystem 406 which is one example of an NFS PseudoFS Master subsystem. The aforementioned elements 402, 404 and 406 may be collectively referred to herein as pseudoFS server software. As well, a memory manager 408 may be provided that comprises an element of the pseudoFS server software. Some example memory types that may be employed in the fileserver 400, and which can be managed by the memory manager 408, are discussed below in connection with FIG. 3. In some embodiments at least, information in the Network Filesystem (NFS) Exports module 402 is persisted, while information in the NFS PseudoFS Exports Module 404, and a NFS4 PseudoFS Master subsystem 406 is stored in memory.

Briefly, the NFS Exports module 402 comprises a listing of NFS exports that may need to be accessed by one or more clients and, as such, will be employed as a basis for construction of a pseudoFS master. In some cases, the NFS exports may not be visible to any client initially, but may only become visible when an ACL has been developed for the exports that indicates which clients are authorized to access which exports.

In the particular example of FIG. 2, the export listing in the NFS Exports module 402 includes four different NFS exports that have been defined, specifically, a variety of different subdirectories that point to objects that a client may need to access, such as backups, files, or other types of data objects. One, some, or all of the listed objects may take the form of a named object, such as the named objects "Oracle backups" and simply "backup" (see '/data/col1/backup' in the listing of NFS Exports module 402) for example, in an administrative namespace. As indicated in FIG. 2, each of the listed objects may have a unique internet protocol (IP) address, such as IP-1, IP-2, IP-3, for example. Initially at least, the objects identified in the NFS Exports module 402 are not accessible to the clients 200. Instead, those object(s), if any, that a client is authorized to access are not made accessible to the client 200 by the NFS 400 unless or until a client-specific pseudoFS has been created that includes that object, or those objects, in its tree.

With continued reference to FIG. 2, the NFS PseudoFS Exports module 404, which may, but need not, be specifically implemented as an NFS4 (NFS version 4) PseudoFS Exports Module, operates to map each of the four NFS exports listed in the NFS Exports module 402 to a corresponding element of the NFS pseudoFS, so as to produce the example grouping of NFS pseudoFS exports, illustrated in the form of paths, shown in the NFS PseudoFS Exports module 404. Such mapping may be performed automatically in response to the addition, or deletion, of an item to/from the list of NFS exports. Changes to that list may be made by an administrator, or a computing entity. For example, when a backup is stored in the data protection environment 300, the list of NFS exports may be updated to include the path to that backup.

It is noted here that the use in this disclosure of the term 'pseudoFS' reflects the notion that the pseudo filesystem does not exist independently of the network filesystem, such as NFS 304 for example, as a separate entity or filesystem. Rather, and as disclosed in more detail elsewhere herein, a pseudoFS is typically defined as comprising less than the entire NFS from which the pseudoFS was derived. As such, the pseudoFS is a construct that is automatically defined and employed ad hoc for the use of a particular client that requires access to certain filesystem exports.

In at least some embodiments, the NFSv4 pseudo filesystem (pseudoFS) is defined by a distributed filesystem protocol NFSv4 RFCs, such as RFC-7530 for example, although pseudoFS can alternatively be defined according to other standards, specifications, protocols, and criteria as well. As used herein, NFSvX refers to any and all versions of the distributed filesystem protocol referred to as Network File System (NFS). The NVSv3 and NFSv4 distributed filesystem protocols, and corresponding system architectures, are incorporated herein in their respective entireties by this reference.

The pseudoFS provides a single-rooted namespace allowing NFS clients to navigate to exported filesystem elements such as directories, subdirectories, or any other type of object. The pseudoFS may span multiple computer systems, linking together namespaces by way of referrals, or the pseudoFS may be combined to a single system. In the particular example of a DataDomain implementation, the NFSv4 release of the pseudoFS overlays an existing DataDomain filesystem structure, providing a consistent view between different versions of the NFS, such as NFSv3 and NFSV4. That is, a given file, such as '/data/col1/backup/myfile,' for example, represents the same file in both NFSv3 and NFSv4, and is accessible through the same paths.

In general, a pseudoFS is generated as needed to allow an associated client to navigate to NFS exports, such as files shared or served from the fileserver 302. The client and fileserver may communicate with each other by way of remote procedure calls (RPC) issued by the client to the server. For security purposes, each NFSv4 client has a discrete view of the pseudoFS, showing only the path components that the particular client is allowed to access. Thus, path components that the client is not authorized to access are not visible to that client. Files in the pseudoFS are represented by a discrete filehandle type that can be readily distinguished by the NFS 302, which may be an NFSv4 server in some embodiments, although no particular NFS type or configuration is required.

The filehandle may be created and assigned by the fileserver 400, and is client-specific. Thus, even if two clients have access to the same export, the respective filehandles employed by those two clients will be different. For example, the client may ask the fileserver if the client can see the export associated with the filehandle that is specific to that client.

As the foregoing suggests, a client 200 can communicate back to the NFS PseudoFS Master subsystem 406. For example, the client 200 may inquire of the NFS PseudoFS Master subsystem 406 as to whether any changes and/or what changes have occurred with respect to nodes in the pseudoFS tree of that client. If the client still has access to the node, the requested information will be provided by the NFS PseudoFS Master subsystem 406 and the client can use that information to update its pseudoFS tree. In some instances, the NFS PseudoFS Master subsystem 406 will push change information to the client, in the form of a notification to the client, on its own initiative. On the other hand, if the client is not authorized to access a node, no notification or change information will be sent to the client concerning changes involving that node.

If an export has been removed, such that an error message is received by an authorized client attempting to access the export, the NFS PseudoFS Master subsystem 406 may send the client information explaining the error message. The client can then update its pseudoFS tree to reflect the change. In this way, the client is able to validate its pseudoFS tree. Thus, a client 200 can validate its pseudoFS tree against the NFS PseudoFS Master subsystem 406. As well, the NFS PseudoFS Master subsystem 406 can validate its master tree **406*a* against the NFS PseudoFS Exports. As well, the client 200 can revalidate itself with the NFS PseudoFS Master subsystem 406 by asking the NFS PseudoFS Master subsystem 406** for any change attributes applicable to the pseudoFS tree of the client, and then the client can update its pseudoFS tree based upon any change attributes that may apply.

In a similar fashion to that just described, the NFS PseudoFS Master subsystem 406 may communicate back to the NFS PseudoFS Exports module 404 concerning changes to the list of exports. For example, the NFS PseudoFS Master subsystem 406 may ask for validation or confirmation that the list of exports held by the NFS PseudoFS Exports module 404 is correct and complete. The NFS PseudoFS Master subsystem 406 can also obtain ACL information from the NFS PseudoFS Exports module 404, which the NFS PseudoFS Master subsystem 406 can use to update its master pseudoFS **406*a*** (discussed below).

C. Aspects of Example PseudoFS Master Subsystem

With reference now to the NFS PseudoFS Master subsystem 406, it can be seen in FIG. 2 that a master pseudoFS **406*a*, also referred to herein as a master tree 406*a*, has been created that contains a unified master view of the NFS pseudoFS, potentially applicable to all clients in the operating environment 100. That is, the master tree 406*a* contains all pseudoFS entries that could potentially be accessed by clients, and also includes references to filesystem exports. The master tree 406*a* is built and updated, automatically in at least some embodiments, by the NFS PseudoFS Exports module 404 when NFS exports are added, modified and deleted, such as by a system administrator or other entity. The master tree 406*a* is referenced by the pseudoFS client subsystems when client-specific pseudoFS filesystem trees, such as the client-specific pseudoFS 502 and 504** discussed below, are built.

In more detail, each of the four filesystem exports of the NFS PseudoFS Exports module 404 has been decomposed into a tree, that is, the master tree **406*a***, that includes eight individual nodes or elements, namely, A, B, C, D, E, F, G and H, each of which is associated with a particular object, except for node A, which is a root. One or more of these nodes can be associated with any other node, or group of nodes, to define one or more client-specific trees, or pseudoFS.

More specifically, and with continuing reference to the example of FIG. 2, two dynamically created client-specific pseudoFS 502 and 504 are indicated. Each of the client-specific pseudoFS 502 and 504 may be associated with a different respective client. Accordingly, in the illustrated example, one such client has an IP address of IP-1, while another such client has an IP address of IP-2. In FIG. 2, both of the client-specific pseudoFS 502 and 504 have a tree structure that begins at the root '/', that is, node A. The tree structure of pseudoFS 502 additionally includes nodes D, B, C and E, while the tree structure of pseudoFS 504 includes, in addition to node A, nodes B, C, E, F and G. Because the tree structures affirmatively define which nodes are accessible by which clients, it can be see, for example, that the client associated with pseudoFS 502 is able to access node D, while the client associated with pseudoFS 502 is not. As another example, the client associated with pseudoFS 504 is able to access nodes F and G, while the client associated with pseudoFS 502 is not.

With continued attention to FIGS. 1 and 2, further details are provided concerning aspects of the structure and construction of a master pseudoFS, such as the master tree 406*a*, and a client-specific pseudoFS, such as client-specific pseudoFS 502 and 504. In general, client-specific pseudoFS 502 and 504 enable their respective clients to access exports residing, for example, at a datacenter or other data storage environment.

The primary master tree 406*a* object is a master node, and any node in the master tree 406*a* is referred to as a master node. More generally, and as used herein, a node defines a specific point in a tree, such as the tree structure of a client-specific pseudoFS or the master tree 406*a*, with properties as shown in Table 1 immediately below. A master node defines a specific node in the master tree 406*a*.

TABLE 1

| Property | Usage |
|---|---|
| Reference Count | Used for pinning/freeing of nodes |
| Export | Reference to export in pseudoFS exports, if any. |
| Generation | Generation count of the individual node |
| ChangeID | Change count of the individual node |
| FileID | Unique fileid for the node |
| Flags | Individual Flags |
| Parent | Reference to parent node |
| Children | List of child nodes |
| Name | Filename |

Outside the NFS PseudoFS Master subsystem 406, a master node is an opaque object, that is, the master node is not accessible or visible to any client that is not authorized to access that node. The only special master node is the filesystem root, node A in the example of FIG. 2, which is created at startup of the NFS PseudoFS Master subsystem 406. All other master nodes are added/removed below the root, as shown in the example client-specific pseudoFS 502 and 504 in FIG. 2.

Because the client-specific pseudoFS is created on-demand, and has a limited lifespan, the nodes in that client-specific pseudoFS, with the exception of the root, have a lifecycle. In particular, pseudoFS master nodes for the master tree 406*a* are allocated from a pool of master nodes specific to the NFS PseudoFS Master subsystem 406. After allocation, the lifecycle of an individual master node is controlled by reference counts to each master node, that is, the number of times that the client associated with that tree accesses the master node.

If a master node is exposed outside the NFS PseudoFS Master subsystem 406, a reference to the master node is taken, ensuring that the master node will not be freed while it is being used. A master node may be exposed and used, for example, where a tree of a client-specific pseudoFS, which may also be referred to as a child tree, takes a reference on a corresponding master node while using that master node. With reference to the foregoing, nodes, including master nodes, are dynamically allocated and freed, that is, are assigned storage from a memory pool, which can be part of the data protection environment 300, and returned to the memory pool when no longer used.

When a master node is freed, that is, the memory containing the master node is returned to the unused memory pool, the memory is no longer valid. This must not happen while it is being used, since any references to the master node by a client-specific pseudoFS would be referring to invalid memory. When the reference count for a master node drops to 0, such as may occur after an explicit command to remove that node, the master node is freed. The NFS PseudoFS Master subsystem 406 also internally takes references as needed, for example, each child node takes a reference on its parent node so that the child is thereby associated with the parent.

After a master node has been removed by an external API, that is, after a master node has been removed from the master tree 406*a*, that master node may continue to exist for a time if it has a reference, such as to a parent and/or child node. Such removed master nodes must not show up, such as when iterating the children of a node. To prevent zombie nodes, logically removed master nodes are flagged as removed until their reference count goes to zero, but the logically removed master nodes are not actually removed until the reference count becomes zero.

Outside the NFS PseudoFS Master subsystem 406, the master nodes are opaque, immutable, objects. As such, no external locking outside the NFS PseudoFS Master subsystem 406 of those master nodes is needed. Internally within the NFS PseudoFS Master subsystem 406, locks are held to enable updates and to provide consistent views of the NFS PseudoFS Master subsystem 406 nodes to the clients. At the time of creation of the NFS PseudoFS Master subsystem 406, the internal lock is a single lock for the entire NFS PseudoFS Master subsystem 406. Subsequently however, locks can be defined and held on a per node basis for one, some, or all, of the nodes within the NFS PseudoFS Master subsystem 406.

With continued reference to Table 1, each node in the NFS PseudoFS Master subsystem 406 contains a generation. The generation can be viewed/modified under application program interface (API) control, for example when an NFS export is updated to change the list of file/directory permissions within its access control list (ACL). In this case, the master tree 406*a* itself might not change, since the NFS export itself is still present. However, the master node(s) referencing the NFS export must be re-evaluated, since the list of clients authorized to access the export by way of those master nodes may have changed.

This evaluation is performed by instructing the NFS PseudoFS Master subsystem 406 to change the generation of the corresponding node(s) that reference the export whose ACL has changed. The pseudoFS client module, such as 202*c*, 204*c* or 206*c*, incorporates the master node generation into the per-client filesystem filehandles. By checking for a change in the generation, the per-client filesystem can be invalidated as needed.

As shown in Table 1, each master node may have several identifiers associated with it. One such identifier is 'generation'—the generation for a node is updated whenever a significant change is made to a master node, such that the master node may be invalidated, that is, not accessible by an authorized client. An example of this might be an export ACL being updated for a master node. If the generation changes for a master node, then users of the node, namely, client trees, may revalidate their information because the resulting client tree may change.

Another master node identifier is 'ChangeID'—the changeID for a master node is updated whenever a change occurs in a master node that may cause it to be different, but not necessarily invalidated. An example of this is when a leaf node changes the branch node above in the tree has its ChangeID updated. One suitable use for the ChangeID is the NFSv4 changed attribute.

Finally, another example master node identifier is 'FileID'—the fileID for a master node is a filesystem-wide value that uniquely identifies a master node. The fileID typically does not change unless the associated master node is invalidated for some reason.

An API as shown in Table 2 below may be provided as the PseudoFS Master API. This API is internal to, and invoked by, the NFS4 PseudoFS Master subsystem 406. Declarations with information about the API may be located, for example, in 'nfs4_pseudofs_master.h.'

TABLE 2

| PseudoFS Master API | Usage |
|---|---|
| nfs4_pseudofs_master_startup | Startup pseudofs master subsystem |
| nfs4_pseudofs_master_shutdown | Shutdown pseudofs master subsystem |
| nfs4_pseudofs_master_root_node | Return the root node of the master tree |
| nfs4_pseudofs_master_node_add | Add a new node to the master tree. |
| nfs4_pseudofs_master_node_remove | Remove a node from the master tree |
| nfs4_pseudofs_master_node_change | Indicate a master node information has changed |
| nfs4_pseudofs_master_node_update_export | Update (set or clear) the export associated with a node |
| nfs4_pseudofs_master_unpin_node | Unpin a previously pinned node |
| nfs4_pseudofs_master_node_iterate_children | Iterate over the children of a node |
| nfs4_pseudofs_master_node_get_child | Get a child of a node by name |
| nfs4_pseudofs_master_get_node_info | Get information about a node |

D. PseudoFS Exports Integration

In one particular embodiment, an NFSv4 pseudoFS provides transition points to/from the normal DataDomain (DD) filesystem at NFS exports. The NSF pseudoFS exports module 404 handles a focused mapping from the general export subsystem to the client-specific pseudoFS.

The API of the NSF pseudoFS Exports Module 404, used by the NFS Exports Module 402, updates the pseudoFS exports entries as NFS exports are updated, where such export updates may include adding, updating or removing exports. As indicated in FIG. 2, each NFS export is translated into one or more master nodes in the NFS PseudoFS Master 406 by the pseudoFS exports module 404. For example, an export of "/data/col1/mtree1" would add master nodes of "/," "data," "col1," and "mtree1." Multiple export subpaths are merged by the PseudoFS Master Subsystem 406.

With continued reference to FIG. 2, the NFS exports subsystem 402 provides information about the export path, the export filehandle and expt_idx plus an opaque export pointer, used for later access to the export by the clients. In at least some embodiments, there is limited coupling between the NFS Exports Subsystem 402 and the NFSv4 PseudoFS Exports Module 404. For example, in such example embodiments, the NFSv4 PseudoFS Exports Module 404 has no knowledge or awareness of client ACL implementations or permissions. Rather, only the information provided through APIs is used by the NFSv4 pseudoFS Exports Module 404.

As noted elsewhere herein, one example of an object employed in connection with various embodiments of the invention is a master node, and another example object is an export. The following discussion provides further details concerning objects, particularly exports, that may be employed in embodiments of the invention.

Each NFS export potentially accessible through NFSv4 has an entry in the pseudoFS export table created and maintained by the NFS PseudoFS Exports Module 404. The table contains a mapping from general NFS exports, listed in the NFS Exports Module 402, to the corresponding pseudoFS master node for the export. Export table entries are hashed by the external export for fast lookup. In general, each export has the properties listed in Table 3 below.

TABLE 3

| Property | Usage |
|---|---|
| Reference Count | Used for pinning/freeing of exports |
| Export | Reference to export in NFS export subsystem |
| Export Index | Export index, provided by NFS export subsystem |
| Export filehandle | Export filehandle, provided by NFS export subsystem |
| Master node | Node in pseudoFS master tree for the export |
| Path | Export full path, provided by NFS export subsystem |

Each NFS export potentially accessible through NFSv4 has an entry in the pseudoFS export table, which may be contained in the NFSv4 PseudoFS Exports Module 404. For backwards compatibility, an export alias may be automatically created for '/data/col1/backup' as '/backup' when such an export is added. The '/backup' alias is a discrete node in the master tree 406*a*, but refers to the same export as '/data/col1/backup.'

With regard to their lifecycle, export entries are allocated and freed from a pool, such as a DataDomain pool in one particular embodiment, that is defined at initialization time. Export entries are allocated on demand, for example when an API call is made to add an export, and the export entries live until freed, that is, until an API call is made to remove the associated export. Every export entry has a reference to a master node of the master tree 406*a*. This reference relation is used both to hold a reference to the master node, and also to allow the master node to be updated, by a change to the generation of the master node, when the NFS exports change.

The NFSv4 pseudoFS export API, defined in nfs4_pseudofs_export_api.h, is primarily used by the NFS Export Subsystem Module 402 to notify the NFSv4 pseudoFS Master Module 406 of changes to the available exports. Details concerning one example of such an API are indicated in Table 4 below.

TABLE 4

| PseudoFS Export API | Usage |
|---|---|
| nfs4_pseudofs_export_startup | Startup pseudofs export subsystem |
| nfs4_pseudofs_export_shutdown | Shutdown pseudofs export subsystem |
| nfs4_pseudofs_export_add | Call to add an export to NFSv4 |
| nfs4_pseudofs_export_remove | Call to remove an export from NFSv4 |
| nfs4_pseudofs_export_change | Call when an export has changed, e.g. an ACL is updated |
| nfs4_pseudofs_export_clear | Remove all NFSv4 export information |

E. PseudoFS Client Filesystems

In general, each NFSv4 client 202, 204, and 206 has a client-specific pseudoFS tree that describes the structure of the pseudoFS created, and used, by that client. Depending on the exports that are accessible to a given client, there may be multiple pseudoFS client trees. The pseudoFS client trees are managed by the pseudoFS client module 202*c*, 204*c*, and 206*c*.

The client pseudoFS trees are created dynamically, that is, on-demand. In at least some embodiments, the client traverses the master tree 406*a* beginning at the root, so as to identify the master node(s) which the client is authorized to access. One or more master nodes may be visible to, by not accessible by, the client. When the authorized master nodes identified, and the references between those nodes have been determined by the client, the client-specific pseudoFS can be created based on that information. In some instances, the client may traverse the master tree 406*a* in a reverse direction, that is, traversing within the tree toward the root rather than traversing away from the root. More generally, a client may traverse a tree in either direction, to any desired depth.

Typically, but not necessarily always, an NFSv4 client 200 will perform a few operations using the pseudoFS, and then not use the pseudoFS again for some time. One example of such operations might take the form of a compound directive to (i) lookup a directory and then (ii) get directory attributes such as the following: {PUTROOTFH, LOOKUP, LOOKUP, LOOKUP, GETATTR}. To handle this type of activity, a per-client pseudoFS is created with a short lifetime, such as about 5 seconds for example, although any other period of time could be used. The client pseudoFS is deleted due to inactivity or to reclaim resources.

With particular reference to a pseudoFS client, such as a NFSv4 pseudofs client for example, the pseudofs client-fs "nf4_pc_client_fs_t" represents the pseudo filesystem for a single NFSv4 client 200. A client fs primarily contains a client-specific pseudoFS tree, built as required to satisfy calls for exports from one or more applications 204*a/b/c* to the client module 206*a/b/c*. Each entry in the client filesystem has a reference to the corresponding master node.

With regard to its lifecycle, a pseudofs client filesystem, or client-specific pseudoFS, is created on-demand when a client 200, such as an NFSv4 client for example, connects to the DataDomain data protection system and performs an operation, such as those noted above, that require a client-specific pseudoFS in order to be able to access one or more exports. The client-specific pseudoFS can be built partially, using hints, or fully. For example, when performing a series of LOOKUP operations in a COMPOUND, the following LOOKUP may be used as a likely hint to determine access in the pseudofs: {PUTROOTFH, LOOKUP, LOOKUP, LOOKUP, GETATTR}.

Depending upon the embodiment, a client-specific pseudoFS may be automatically cleaned, that is, invalidated and the associated memory reclaimed, when that client-specific pseudoFS not been used for a short period, such as about 5 minutes for example, although any other time period could alternatively be used. For the first implementation this is through a DataDomain Filesystem (DDFS) CRON job. Note that as used herein, CRON refers to a Linux utility which can be used to create and schedule jobs on the fileserver to run automatically at a specified time and date, and a CRON job is the scheduled task itself. The use of CRON jobs may be particularly useful in situations where there is a need to automate repetitive tasks. If a large number of clients are used, the client filesystem allocator can trigger cleaning on demand. Various thresholds can be applied to determine when cleaning will be triggered, such when about 5%, for example, of the clients are free. In more detail, the pseudoFS server software has a component to manage memory used for the client pseudoFS trees. Part of the management operation is to regularly find custom client pseudoFS that are not recently used and dismantle them, so returning the memory resources used to create the client pseudoFS trees back to the unused-memory pool.

With continuing reference to objects of a pseudoFS client filesystem, also referred to herein as a client-specified pseudoFS, the DataDomain Restorer (DDR) Secure Multi Tenancy (SMT) feature provides isolation by local (DDR) IP address. In general, the DataDomain SMT enables the data protection system and environment to isolate and securely store backups and replication data for multiple different tenants, where each tenant has a logically secure, and isolated, data and control paths on the DataDomain, or other, data protection system and environment. Thus, when SMT, or equivalent, is enabled, a client may have different access, and a different pseudoFS view, based on the local IP address of that client. This is handled by storing the local IP address for each client as part of its pseudoFS client filesystem, along with the SMT IP mapping version, at the time the client pseudoFS is created. On each client operation that involves a pseudoFS filehandle, the checks made when SMT is used include:

- Validating that the SMT IP mapping version has not changed; and
- Validating that the local IP address for the current client matches the client filesystem stored IP address.

If either of these checks fails, then the filehandle validation check fails, and during normal processing, the pseudoFS client filesystem will be rebuilt, potentially with a different set of exports if the client access has changed due to local IP mapping change.

Turning now to client filesystem entry, a pseudoFS client filesystem tree is comprised of client filesystem entries. An entry contains a reference to the corresponding node in the pseudoFS master subsystem 406. In at least some embodiments, it is assumed that a client will typically have a small number of entries in its filesystem, so those entries are defined as a simple array. Client filesystem trees with a large number of entries are supported through dynamically reallocating the entry array as-needed. Entries are identified by an integer value; this is an index into the client filesystem entry array in the initial implementation. Note that a filesystem entry does not contain a change generation. The generation is held in the associated master node. If a master node changes, then when clients next access the master node, a generation mismatch is detected, and the corresponding entry in the array is invalidated. In general, entries are created as a client filesystem tree is filled. The entries live until invalidated and the tree of the client-specific pseudoFS is removed, either when the full client filesystem is cleaned, or when the entry is individually cleanly.

Embodiments of an NFS pseudoFS subsystem, such as the NFSv4 pseudoFS subsystem for example, employ an API within the subsystem. Information concerning one example of such an API is presented in Table 5 below.

TABLE 5

| PseudoFS Export API | Usage |
|---|---|
| nfs4_pseudofs_client_startup | Startup pseudofs client subsystem |
| nfs4_pseudofs_client_shutdown | Shutdown pseudofs client subsystem |
| nfs4_pseudofs_get_client | Get a client fs and pin it, optionally creating the client fs if needed |
| nfs4_pseudofs_put_client | Unpin a client fs |
| nfs4_pseudofs_client_get_entry | Get a client fs entry from a filehandle. |
| nfs4_pseudofs_client_get_parent_entry | Get the parent entry for a client fs entry |
| nfs4_pseudofs_client_get_child_entry | Get a child fs entry by name for a client fs entry |
| nfs4_pseudofs_client_fs_entry_to_dd_fh | Get a dd_nfs_fh_t for a given client entry |
| nfs4_pseudofs_client_fh_is_valid | Check if a pseudofs filehandle is valid for a client |
| nfs4_pseudofs_get_client_root_fh | Get the root filehandle for a client fs |
| nfs4_pseudofs_client_get_entry_attrs | Get attributes for a client fs entry. |
| nfs4_pseudofs_client_invalidate_all | Invalidate all client filesystem entries |
| nfs4_pseudofs_invalidate_client | Invalidate a single client |

F. PseudoFS Programming API

Embodiments of the invention also provide for a pseudoFS programming API. The pseudoFS programming API may be employed in connection with NFSv4 operations and infrastructure, or the operations and infrastructure of other network filesystems. In one example embodiment, the APIs in Table 6 below are defined in nfs4_pseudofs_api.h.

TABLE 6

| API | Usage |
|---|---|
| nfs4_pseudoFS_startup | Startup pseudofs subsystem |
| nfs4_pseudoFS_shutdown | Shutdown pseudofs subsystem |
| nfs4_is_pseudofs_fh | Check if a filehandle is a valid pseudoFS handle |
| nfs4_pseudofs_get_root_handle | Get the Root filehandle |
| nfs4_pseudofs_lookup | Lookup an entry in the pseudofs |
| nfs4_pseudofs_lookupp | Lookup the parent entry in the pseudofs |
| nfs4_pseudofs_access | Determine access for objects in the pseudofs |
| nfs4_pseudofs_getattr | Get attributes of an entry in the pseudofs |
| nfs4_pseudofs_get_client_acl | Get the client ACL for the pseudoFS |
| nfs4_pseudofs_iterate_children | Iterate over children in a pseudoFS directory. |

G. PseudoFS and NFSv4 Elements

With reference first to NFSv4 operations, such NFSv4 operations may employ special interactions with the pseudoFS, including:

PUTROOTFH. Get the filesystem root filehandle, as determined by the pseudoFS subsystem. This may be a real or pseudoFS filehandle, depending on whether or not the root '/' is exported by administrators.

ACCESS. Check access to objects in then pseudoFS

LOOKUP. Lookup a filehandle where the current directory is a pseudoFS handle.

LOOKUPP. Lookup the parent filehandle where the current directory is a pseudoFS handle.

READDIR. Read directories in the pseudoFS

GETATTR. Get attributes of directories in the pseudoFS.

VERIFY. Get attributes of directories in the pseudoFS

NVERIFY. Get attributes of directories in the pseudoFS

Other NFSv4 operations need to check for pseudoFS filehandles, and reject disallowed operations as appropriate. For example, the CREATE operation is never allowed for a filehandle in the pseudoFS.

Various embodiments of a pseudoFS include one or more directory entries with various attributes. For example, the NFSv4 pseudoFS, among others, may include directory entries that each have the attributes listed in Table 7 below. In addition to the listed attributes, standard NFSv4 read-only attributes, such as supported attributes, can be used.

TABLE 7

| Attribute | Value |
|---|---|
| Owner | UID 0 |
| Owner Group | GID 0 |
| Type | NF4DIR (Directory) |
| Mode | 0555 (Read/Search All), equivalent ACL |
| Fileid | Unique fileid within pseudoFS |
| FSID | Unique FSID for pseudoFS |
| NLINK | 1 for each subdirectory, +1 for parent (if not root) |
| Filehandle | PseudoFS-specific filehandle |
| fh_expire_type | FH4_VOLATILE_ANY |
| change | Master Node ChangeID |
| Filehandle | PseudoFS filehandle for node |
| Size | 0 |
| Time_Access | 0 |
| Time_Create | 0 |
| Time_Metadata | 0 |
| Time_Modify | 0 |

H. Example Host and Server Configurations

Figure 3:
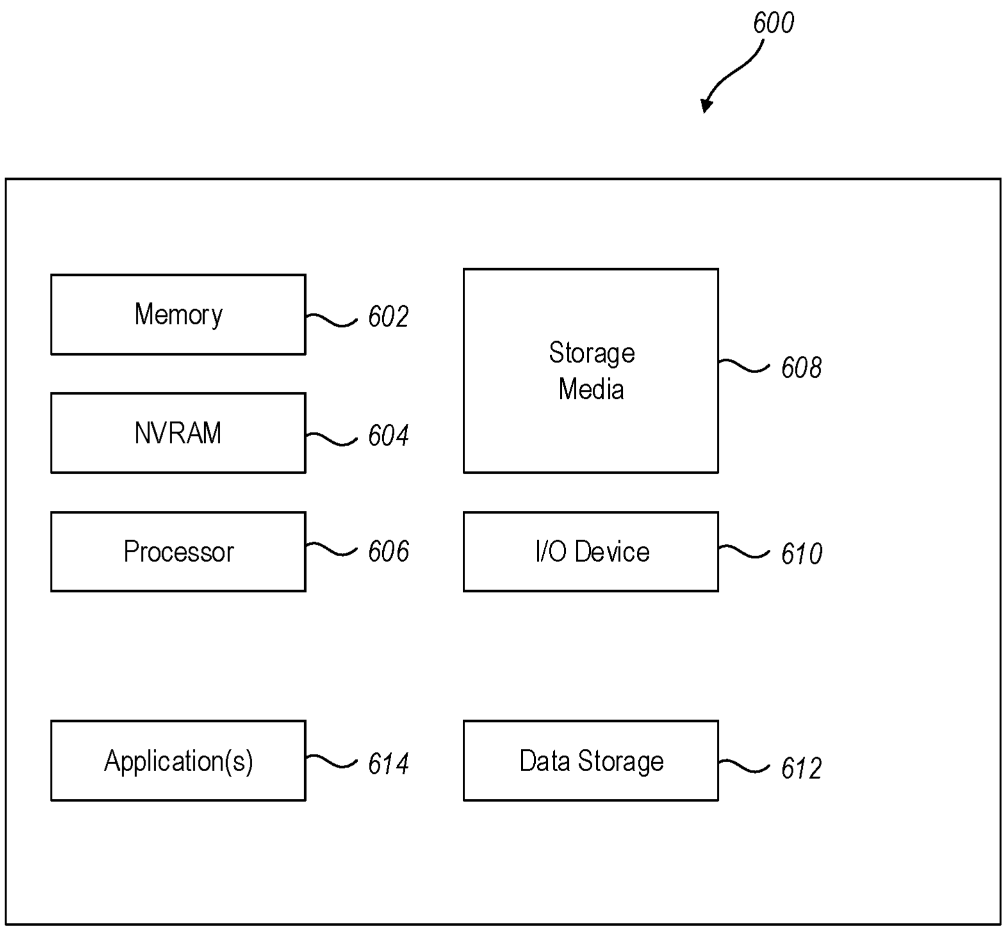
FIG. 3 discloses aspects of an example physical computing device configuration.

Turning now to FIG. 3, one or more of the clients 200 and its components, and fileserver 302 and its components, can take the form of a physical computing device, one example of which is denoted at 600. As well, where any of the aforementioned elements comprise or consist of a VM, that VM may constitute a virtualization of any combination of the physical components disclosed in FIG. 3.

In the example of FIG. 3, the physical computing device 600 includes a memory 602 which can include one, some, or all, of random access memory (RAM), non-volatile random access memory (NVRAM) 604, read-only memory (ROM), and persistent memory, one or more hardware processors 606, non-transitory storage media 608, I/O device 610, and data storage 612. One or more of the memory components of the physical computing device can take the form of solid state device (SSD) storage. As well, one or more applications 614 are provided that comprise executable instructions. Such executable instructions can take various forms including, for example, a pseudoFS client module, an NFS export module, an NFS pseudoFS export module, and an NFS pseudoFS master subsystem.

I. Aspects of Some Example Methods

With the example operating environment 100 of FIG. 1 in view, details are now provided concerning aspects of some example methods according to various embodiments of the invention. Such methods may be performed in whole or in part in various example operating environments, including the operating environment 100. One example of such a method is denoted generally at 700 in FIG. 4.

Initially, the process 700 can begin when a client connects 702 to a data protection system, one example of which is the Dell-EMC DataDomain data protection system. Typically, the client will connect 702 to the data protection system in order to perform an operation concerning data stored at the data protection system, or data that is intended to be stored at the data protection system, such as a read, write or delete operation for example.

After the client has connected 702 to the data protection system, the client can then initiate 704 one of the aforementioned operations, or another operation. In response to initiation 704 of the client operation, the server, such as a fileserver for example, may then identify 706 the node, or nodes, of a master pseudoFS that the client is authorized to access. This identification 706 of the accessible may be inferentially communicated to the client. As part of process 702 and/or 704, or separately, the client may mount a filesystem locally at the client. The portion(s) of the filesystem that the client is authorized to access may then be subsequently made available to the client.

In particular, in at least some embodiments, the client becomes aware of the master pseudoFS nodes it is authorized to access by traversing the master pseudoFS and using the information found during the traversal to automatically create 708 a client-specific pseudoFS that consists of only those nodes of the master pseudoFS that the client is authorized to access. That is, during the traversal of the master pseudoFS, the client is only permitted to see those nodes of the master pseudoFS that the client is authorized to access. Unauthorized nodes of the master pseudoFS will not be visible to the client.

As disclosed elsewhere herein, the client-specific pseudoFS that is created 708 will typically, but not necessarily, be less extensive than the master pseudoFS. That is, the client-specific pseudoFS may consist of fewer nodes than the master pseudoFS. Moreover, the client-specific pseudoFS is virtual in the sense that the client-specific pseudoFS does not exist separate and apart from the master pseudoFS, which is not virtual. Rather, the client-specific pseudoFS is a construct that is created 708 based upon the master pseudoFS. Thus, the client-specific pseudoFS is typically, if not always, less extensive than the master pseudoFS. As noted elsewhere herein, this is advantageous inasmuch as it reflects the fact that each client can access only those nodes defined in an export ACL, rather than all of the nodes in the master pseudoFS. This, in turn, enhances the overall security of the exports.

With continued reference to the construction 708 of the client-specific pseudoFS, it may be created automatically and only on-demand, when needed for whatever operation(s) were initiated 704 at the client. Because the client-specific pseudoFS consumes memory, the on-demand construction aids efficient use of memory, as well as efficient use of processing resources that are needed to create the client-specific pseudoFS. Efficiency gains may be particularly significant in systems that may include a master pseudoFS with a large number of nodes, and that include a large number of clients that may need access to one or more nodes of the master pseudoFS. Once the client-specific pseudoFS has been created 708, various operations, examples of which were noted elsewhere herein, can be performed 710 that access one or more of the fileserver nodes that form part of the client-specific pseudoFS.

Figure 4:
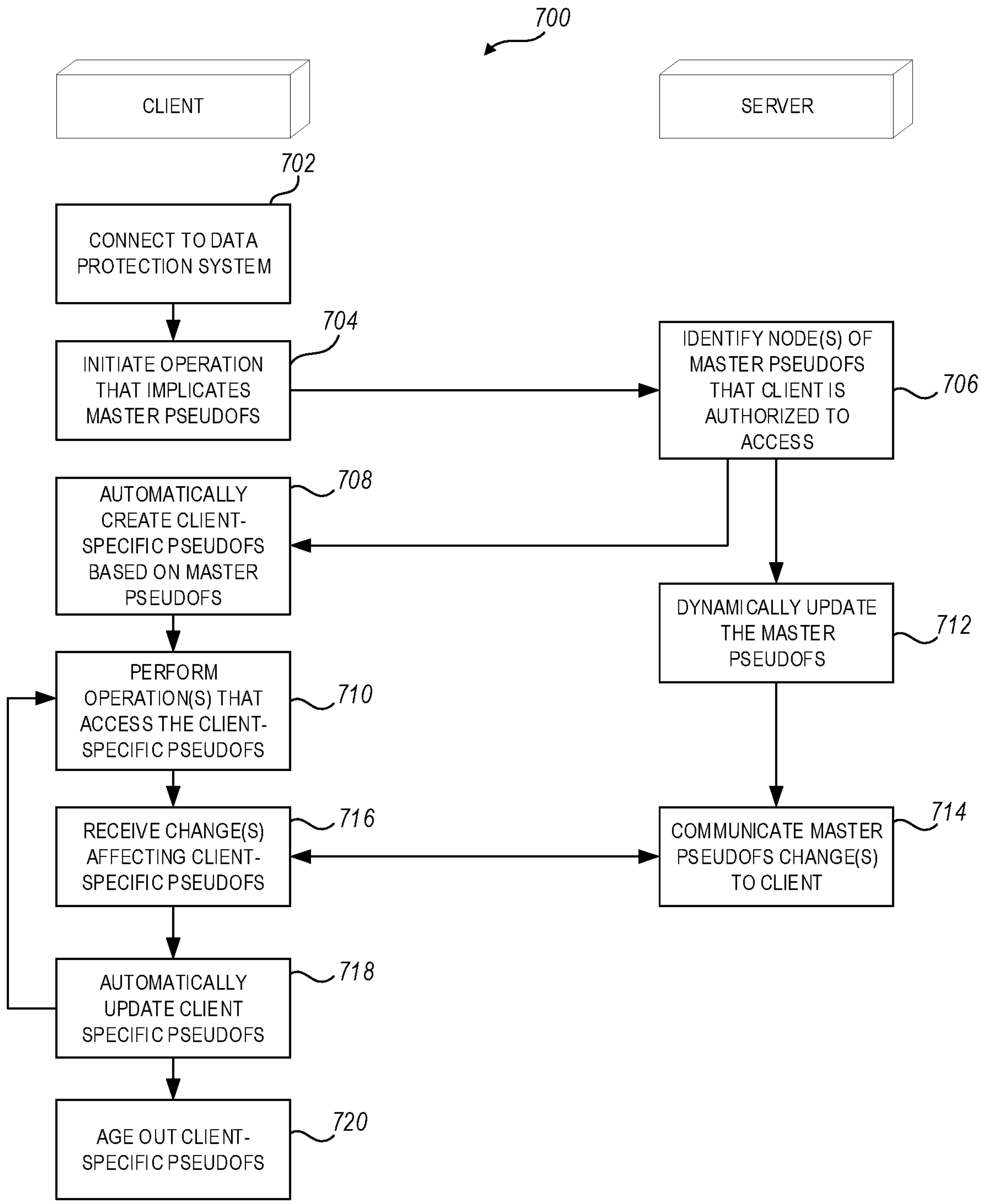
FIG. 4 discloses aspects of example methods for the creation and use of a master pseudofs and client-specific pseudofs.

As further indicated in FIG. 4, and disclosed herein, the master pseudoFS may be dynamically, or automatically, updated 712 to reflect changes to the exports. Such changes may include, for example, addition or removal of an export, and a change to an ACL of an export. This dynamic update 712 of the master pseudoFS may be achieved, for example, by communication between the NFS4 PseudoFS Master subsystem 406 and NFS PseudoFS Exports Module 404. This communication can be initiated by either of the aforementioned components, and may occur automatically upon the occurrence of a change involving an export. Thus, the update 712 may occur automatically in response to a change involving an export.

Updates 712 to the master pseudoFS can then be communicated 714, in various ways, to any client(s) implicated by the change to the master pseudoFS. This communication may take place automatically in response to a change to the master pseudoFS. For example, such an update can may be affirmatively communicated by the NFS4 PseudoFS Master subsystem 406 to the client. Alternatively, the client may request the fileserver to identify any changes involving one or more nodes of the client-specific pseudoFS. In any case, the changes are received 716 at the client.

Once the changes have been received 716 at the client, the client-specific pseudoFS may then be automatically updated 718 to reflect the changes. At this point, the method 700 may then return to process 710, where the client begins to perform operations involving the client-specific pseudoFS. As will be apparent, the receipt and incorporation of changes to the master pseudoFS and the client-specific pseudoFS can occur repeatedly. In instances where a change to the master pseudoFS do not involve one or more client-specific pseudoFSs, the change will not be communicated to those client(s) and those particular client pseudoFSs will not be updated. Advantageously then, master pseudoFS changes are only communicated to the client(s) that are implicated by the changes. Again, this approach enables the efficient use of memory and processing resources.

At some point, the client-specific pseudoFS may no longer be needed. Thus, embodiments of the invention provide that a client-specific pseudoFS may age out 720 after the passage of a predetermined amount of time. By aging out a client-specific pseudoFS when it is no longer needed, memory and processing resources are utilized more efficiently. In some example embodiments, a client-specific pseudoFS may be aged out after about 5 minutes. In other embodiments, a client-specific pseudoFS may be aged out upon the occurrence of a particular event, such as client boot up, or filesystem mounting at the client.

J. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising performing the following operations:

connecting, by a client, to a fileserver of a data protection system;

initiating, by an application hosted at the client, a filesystem operation that is associated with a master pseudofs of the fileserver, and the master pseudofs comprises a non-virtual filesystem that is accessible by the client;

creating, at the client, and on an as-needed basis, a client-specific pseudofs that comprises only those nodes of the master pseudofs that the client is authorized to access, and the client-specific pseudofs comprises a virtual filesystem whose configuration is derived from a configuration of the non-virtual filesystem of the master pseudofs, wherein the nodes comprise respective path components, and the client-specific pseudofs provides a discrete view to the client that shows only those path components that the client is allowed to access; and performing, at the client, the filesystem operation using the client-specific pseudofs.

2. The method as recited in claim 1, wherein creating the client-specific pseudofs comprises traversing, by the client, a master tree associated with the master pseudofs and identifying, by the client, one or more nodes of the master tree that the client is authorized to access.

3. The method as recited in claim 1, wherein a file in the client-specific pseudofs is represented by a discrete file-handle type that can be distinguished by the filesystem.

4. The method as recited in claim 1, wherein the client-specific pseudofs does not exist separately from the master pseudofs.

5. The method as recited in claim 1, wherein the filesystem operation performed at the client comprises one or more of a read operation, a write operation, a delete operation, or a restore operation.

6. The method as recited in claim 1, further comprising automatically updating, by the client, the client-specific pseudofs to reflect a change involving an export that the client was previously authorized to access.

7. The method as recited in claim 1, wherein information concerning a change to the master pseudofs is communicated automatically by the master pseudofs to the client-specific pseudofs at the client.

8. The method as recited in claim 7, wherein the change to the master pseudofs concerns one or more of addition of an export, removal of an export, or a change to an export access control list (ACL).

9. The method as recited in claim 1, further comprising allowing the client-specific pseudofs to age out.

10. The method as recited in claim 1, further comprising validating, by the client, the client-specific pseudofs against the master pseudofs.

11. A non-transitory storage medium having stored therein instructions which are executable by one or more hardware processors to perform operations comprising:

connecting, by a client, to a fileserver of a data protection system;

initiating, by an application hosted at the client, a filesystem operation that is associated with a master pseudofs of the fileserver, and the master pseudofs comprises a non-virtual filesystem that is accessible by the client;

creating, at the client, and on an as-needed basis, a client-specific pseudofs that comprises only those nodes of the master pseudofs that the client is authorized to access, and the client-specific pseudofs comprises a virtual filesystem whose configuration is derived from a configuration of the non-virtual filesystem of the master pseudofs, wherein the nodes comprise respective path components, and the client-specific pseudofs provides a discrete view to the client that shows only those path components that the client is allowed to access; and performing, at the client, the filesystem operation using the client-specific pseudofs.

12. The non-transitory storage medium as recited in claim 11, wherein creating the client-specific pseudofs comprises traversing, by the client, a master tree associated with the master pseudofs and identifying, by the client, one or more nodes of the master tree that the client is authorized to access.

13. The non-transitory storage medium as recited in claim 11, wherein a file in the client-specific pseudofs is represented by a discrete filehandle type that can be distinguished by the filesystem.

14. The non-transitory storage medium as recited in claim 11, wherein the client-specific pseudofs does not exist separately from the master pseudofs.

15. The non-transitory storage medium as recited in claim 11, wherein the operations further comprise automatically updating, by the client, the client-specific pseudofs to reflect a change involving an export that the client was previously authorized to access.

16. The non-transitory storage medium as recited in claim 11, wherein information concerning a change to the master pseudofs is communicated automatically by the master pseudofs to the client-specific pseudofs at the client.

17. The non-transitory storage medium as recited in claim 16, wherein the change to the master pseudofs concerns one or more of addition of an export, removal of an export, or a change to an export access control list (ACL).

18. The non-transitory storage medium as recited in claim 11, wherein the operations further comprise allowing the client-specific pseudofs to age out.

19. The non-transitory storage medium as recited in claim 11, wherein the operations further comprise validating, by the client, the client-specific pseudofs against the master pseudofs.

* * * * *